US008804496B2

(12) United States Patent
Guichard et al.

(10) Patent No.: US 8,804,496 B2
(45) Date of Patent: *Aug. 12, 2014

(54) PROTECTING MULTI-SEGMENT PSEUDOWIRES (75) Inventors: Jim Guichard, New Boston, NH (US); Luca Martini, Lakewood, CO (US); Keyur Patel, San Jose, CA (US); Thomas David Nadeau, Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/315,948

(22) Filed: Dec. 9, 2011

(65) Prior Publication Data

US 2012/0082025 A1 Apr. 5, 2012

Related U.S. Application Data (63) Continuation of application No. 11/580,167, filed on Oct. 11, 2006, now Pat. No. 8,081,563.

(51) Int. Cl.
G01R 31/08 (2006.01)
(52) U.S. Cl.
USPC ........... 370/221; 370/225; 370/228; 370/217; 370/218; 370/224
(58) Field of Classification Search
USPC .................. 370/218, 217, 221, 225, 228
See application file for complete search history.

(56) References Cited

U.S. PATENT DOCUMENTS

| 5,412,376 | A | 5/1995 | Chujo et al. |
|---|---|---|---|
| 7,298,693 | B1 | 11/2007 | Owens et al. |
| 8,081,563 | B2 | 12/2011 | Guichard et al. ............. 370/221 |
| 2003/0223357 | A1 | 12/2003 | Lee |
| 2004/0190444 | A1* | 9/2004 | Trudel et al. .................. 370/224 |
| 2004/0205239 | A1 | 10/2004 | Doshi et al. |
| 2004/0233891 | A1 | 11/2004 | Regan et al. |
| 2006/0047851 | A1* | 3/2006 | Voit et al. ...................... 709/239 |
| 2006/0126502 | A1 | 6/2006 | Vasseur et al. |
| 2006/0133265 | A1 | 6/2006 | Lee .............................. 370/228 |
| 2006/0146832 | A1* | 7/2006 | Rampal et al. ............. 370/395.5 |

(Continued)

FOREIGN PATENT DOCUMENTS

EP 1482694 A2 1/2004

OTHER PUBLICATIONS

Office Action dated Jul. 1, 2010 received in related Chinese Application No. 200780038091.6.

(Continued)

Primary Examiner — Omer S Mian
(74) Attorney, Agent, or Firm — Brinks Gilson & Lione (57) ABSTRACT The protection of multi-segment pseudowires by utilizing backup paths is disclosed herein. Disclosed embodiments include methods that establish at least one backup path for multi-segment pseudowires, the establishing being performed prior to detection of failure in the primary path. Upon detecting a path failure, the detected failure is signaled to the head-end, a backup path is chosen, and reachability information associated with the chosen backup path is signaled across the backup path before reverse traffic is switched to the backup path. In other disclosed embodiments, apparatus are configured to establish, prior to detection of failure in the primary path, at least one backup path for the multi-segment pseudowire.

17 Claims, 5 Drawing Sheets

400

410
COMPUTE A PRIMARY PATH FROM THE HEAD-END OF A MULTI-SEGMENT PSEUDOWIRE TO THE TAIL-END OF THE MULTI-SEGMENT PSEUDOWIRE

420
ESTABLISH, PRIOR TO DETECTION OF A FAILURE IN THE PRIMARY PATH, AT LEAST ONE BACKUP PATH FROM THE HEAD-END OF THE MULTI-SEGMENT PSEUDOWIRE TO THE TAIL-END OF THE MULTI-SEGMENT PSEUDOWIRE

422
THE HEAD-END, FUNCTIONING AS A PATH COMPUTATION CLIENT, REQUESTS A PATH FROM A PSEUDOWIRE STITCHING POINT, FUNCTIONING AS A PATH COMPUTATION ELEMENT, THAT EXCLUDES THE PSEUDOWIRE STITCHING POINT

424
ESTABLISH THE AT LEAST ONE BACKUP PATH, INCLUDING A BACKUP PATH THAT DOES NOT INCLUDE THE PSEUDOWIRE STITCHING POINT

(56) References Cited

U.S. PATENT DOCUMENTS

| | | |
|---|---|---|
| 2006/0153067 A1 | 7/2006 | Vasseur et al. ............. 370/217 |
| 2006/0215548 A1 | 9/2006 | LeFaucheur et al. |
| 2008/0084891 A1 | 4/2008 | Balus et al. |
| 2008/0253367 A1 | 10/2008 | Ould-Brahim |

OTHER PUBLICATIONS

Second Office Action dated Aug. 29, 2011 received in related Chinese Application No. 200780038091.6.

Farrel, et al., "A Path Computation Element (PCE) Based Architecture," *Network Working Group, IETF Internet Draft*, Apr. 2006, pp. 1-75.

Dong, et al., "Operation and Maintenance for Multi-segment Pseudo Wire," *PWE3 Working Group, Internet Draft*, Feb. 24, 2006, pp. 1-37.

Vasseur, et al., "Path Computation Element (PCE) communication Protocol (PCEP)—Version 1," *Networking Group, Internet Draft*, Jun. 22, 2006, pp. 1-125.

Bryant, et al., "Pseudo Wire Emulation Edge-to-Edge (PWE3) Architecture," *Network Working Group*, Mar. 2005, pp. 1-85.

Pan, et al., "Pseudo Wire Protection," *PWE3 Working Group, Internet Draft*, Jul. 2006, pp. 1-40.

LeRoux, et al., "Requirements for Inter-Area MPLS Traffic Engineering," *TEWG Working Group, Internet Draft*, Nov. 2004, pp. 1-30.

Bitar, et al., "Requirements for inter domain Pseudo-Wires," *Working Group, Internet Draft*, May 2006, pp. 1-50.

Vasseur et al., Inter-area and Inter-AS MPLS Traffic Engineering, draft-vasseur-ccamp-inter-area-as-te-00.txt, dated Feb. 2004, pp. 1-44, IETF, available at http://www.ietf.org/ietf/lid-abstracts.txt.

Ayyangar et al., Inter Domain GMPLS Traffic Engineering—RSVP-TE Extensions, draft-ietf-ccamp-inter-domain-rsvp-te-03.txt, dated Mar. 2006, pp. 1-24, IETF, available at http://www.ietf.org/ietf/lid-abstracts.txt.

European Search Report, dated May 31, 2012, pp. 1-9, European Patent Application No. 07852511.0, European Patent Office, Germany.

\* cited by examiner

PROTECTING MULTI-SEGMENT PSEUDOWIRES

CROSS-REFERENCE TO RELATED APPLICATIONS

This application is a continuation application of U.S. patent application Ser. No. 11/580,167, filed Oct. 11, 2006, which is hereby incorporated by reference in its entirety.

FIELD OF THE INVENTION

The present disclosure relates generally to protecting pseudowires. For example, the present disclosure illustrates that multi-segment pseudowires can be protected by utilizing pre-computed backup paths.

BACKGROUND OF THE INVENTION

Computer networks have become ubiquitous. Computer networks include the Internet, Service Provider (SP) networks, private networks, and Local Area Networks (LANs). A network such as an SP network may include peripherally located Provider Edge (PE) routers, each of which couples to one or multiple Customer Edge (CE) routers. The PE routers are used to maintain routing and forwarding context for each customer. The CE routers may couple to private LANs associated with one or multiple customers. The private LANs are frequently referred to as core networks. The PE routers learn local customer routes from the CE routers and distribute remote customer routes to the CE router. The PEs may use Border Gateway Protocol (BGP) to distribute customer routes to each other.

To support operation, the PE routers typically maintain Virtual Routing and Forwarding (VRF) information in a table (a VRF table) dictating how to route and forward traffic through the shared physical network to support corresponding Virtual Private Networks (VPNs) for the different customers. Typically, the SP network selectively couples the LANs to each other through links created between its PE routers. For the core network, an ingress PE may use BGP functions to determine the egress PE. The ingress PE can put the packet in a two-level Multi Protocol Label Switching (MPLS) stack. The top label is used to tunnel packets to the egress PE to accomplish MPLS forwarding through the core network. The bottom label is used by the egress PE to identify the outgoing route for the packet. VPNs provide a secured means for transmitting and receiving data between network nodes even though a corresponding physical network supporting propagation of the data is shared by many users (and VPNs). In a typical networking environment used for routing data, the environment may include a number of Customer Edge (CE) routers, a number of Provider Edge (PE) routers and a packet-switched network (PSN). Data, encapsulated in layer-2 frames, may be forwarded from a first CE router to a first PE router, from the first PE router across the PSN to a second PE router, and from the second PE router to a second CE router.

In particular conventional systems, a PDU (e.g., a frame) traverses the networking environment beginning at a first CE router and ending up at a second CE router. The first CE router sends a layer-2 PDU to an ingress PE router. The ingress PE router receives the PDU and encapsulates the PDU with MPLS labels which are used to identify the individual port/circuit and the egress layer-3 PE router. The encapsulated PDU is then forwarded on the PW, across the packet-switched network, to an egress layer-3 PE router. The egress layer-3 PE router removes the MPLS label that identifies the port/circuit that was added by the ingress PE router and forwards the layer-2 PDU to the second CE router.

Pseudowires ("PWs") are known in the art of computer networking and telecommunications. A Pseudowire (PW) may be utilized to transfer data across the PSN. In general, a pseudowire is an emulation of the essential attributes of a telecommunications service over a Packet Switched Network ("PSN"). The service may be ATM, T1 leased line, Frame Relay, Ethernet, low-rate TDM, or SONET/SDH, for example. The PSN may be Multiprotocol Label Switching ("MPLS"), IP (either Ipv4 or Ipv6), or Layer 2 Tunnel Protocol Version 3 ("L2TPv3"). The functions provided by a PW includes encapsulating service-specific bit streams, cells, or PDUs arriving at an ingress port and carrying them across a path or tunnel, managing their timing and order, and any other operations required to emulate the behavior and characteristics of the particular service. Pseudowires can be used to carry ingress layer-2 traffic from an ingress PE router to an egress PE router, and the forward the layer-2 traffic out of an egress port of the egress PE router.

Multi-Segment Pseudowires ("MS-PWs") are also known in the art. MS-PWs may transit more than one PSN domain and more than one PSN tunnel. MS-PWs have become necessary for the extension of network and transport services such as layer-2 and layer-3 technologies across domains. A domain refers to a collection of network elements within a common sphere of address management or path computational responsibility such as an IGP area, Autonomous System ("AS"), service provider area, or area with reduced routing state such as is the case with Route Summarization in effect. Multiple pseudowire segments (i.e., single-hop pseudowires) are stitched together to create a single end-to-end multi-segment pseudowire (i.e., a multi-hop pseudowire) from the source of the pseudowire to the destination of the pseudowire.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DESCRIPTION OF EXAMPLE EMBODIMENTS

Overview

If a stitching point in a multi-segment pseudowire fails, the pseudowire will eventually recover based on IGP convergence within all segments of the end-to-end path. However, this convergence time can be extensive given the multiple segment nature of the pseudowire. Additionally, the fast restoration of an end-to-end pseudowire path is not possible using current signaling protocols. Multi-level pseudowires suffer from a lack of reachability information because pseudowire segments in multi-segment pseudowires are signaled a priori and only between pseudowire switching routers. Because of this lack of reachability information, rerouting and repair of defects in the pseudowire can occur only at the transport layer (i.e., MPLS or IP), which carries the pseudowire segments between stitching points. Thus, with the current technology, restoration of an end-to-end multi-segment pseudowire path requires the entire end-to-end pseudowire path to be resignalled or requires the use of manual methods, which are slow, prone to error, and insufficiently resilient to additional future failures.

Techniques discussed herein deviate with respect to conventional techniques for protecting pseudowires such as those discussed above and other techniques also known in the prior art. That is, the protection of multi-segment pseudowires by utilizing pre-computed backup paths is disclosed herein. Techniques disclosed herein may be encoded as logic in one or more tangible media for execution and when executed operable to perform the encoded techniques. For example, a first example disclosure embodies logic encoded in one or more tangible media for execution and when executed operable to detect a failure of a pseudowire stitching point in a multi-segment pseudowire containing a head-end and a tail-end; signal the detected failure to the head-end; choose a pre-computed backup path that does not include the failed stitching point; and signal the backup path to the tail-end.

A second disclosure embodies an apparatus comprising logic operable to receive a signal indicating a path failure in a multi-segment pseudowire having a head-end and a tail-end; choose a pre-computed backup path for the pseudowire; and initiate a signal to the tail-end indicating the backup path chosen. A third disclosure embodies an apparatus comprising logic operable to compute a primary path from the apparatus, functioning as a head-end of a multi-segment pseudowire, to a tail-end of a multi-segment pseudowire; and establish, prior to detection of a failure in the primary path, at least one backup path from the head-end of the multi-segment pseudowire to the tail-end of the multi-segment pseudowire.

DESCRIPTION

A Provider Edge ("PE") is the device that provides the pseudowire to a CE and, as is known in the art, are connected to Customer Edge Equipment ("CE") via Attachment Circuitry ("AC"). That is, the AC is a physical or virtual circuit attaching a CE to a PE. Attachment Circuitry may be, for example, a Frame Relay DLCI, an ATM VPI/VCI, an Ethernet port, a VLAN, a PPP connection on a physical interface, a PPP session from an L2TP tunnel, or an MPLS LSP. If the ACs at both ends of the pseudowire are of the same technology (e.g., both ATM, both Ethernet, both Frame Relay), the pseudowire is said to provide "homogeneous transport;" otherwise, it is said to provide "heterogeneous transport." PEs may also be referred to as terminal PEs ("T-PEs") or user PEs ("uPEs") for a pseudowire running between two PEs. The T-PE from which traffic originates, also referred to as the source, is referred to herein as the head-end of the pseudowire and the T-PE to which traffic is destined, also referred to as a sink, is referred to herein as the tail-end of the pseudowire. Thus, a CE is a device where one end of a service originates and/or terminates. Generally, the CE is not aware that it is using a pseudowire rather than a native service. From the perspective of the CE, the pseudowire is characterized as an unshared link or circuit of the chosen service.

Tunneling is a method of transparently carrying information over a network. A Packet Switched Network tunnel is a tunnel across a PSN, inside which one or more pseudowires can be carried. PSN tunnel signaling is used to set up, maintain, and tear down the underlying PSN tunnel. A Protocol Data Unit ("PDU") is the unit of data output to, or received from, the network by a protocol layer. A pseudowire PDU is a PDU sent on the pseudowire that contains all of the data and control information necessary to emulate the desired service.

Two PEs provide one or more PWs on behalf of their client CEs to enable the client CEs to communicate over the PSN. A PSN tunnel is established to provide a data path for the PW. The PW traffic is invisible to the core network, and the core network is transparent to the CEs. Native data units (bits, cells, or packets) arrive via the AC, are encapsulated in a PW-PDU, and are carried across the underlying network via the PSN tunnel. The PEs perform the necessary encapsulation and decapsulation (also sometimes referred to as imposition and disposition) of PW-PDUs and handle any other functions required by the PW service, such as sequencing or timing.

Figure 1:
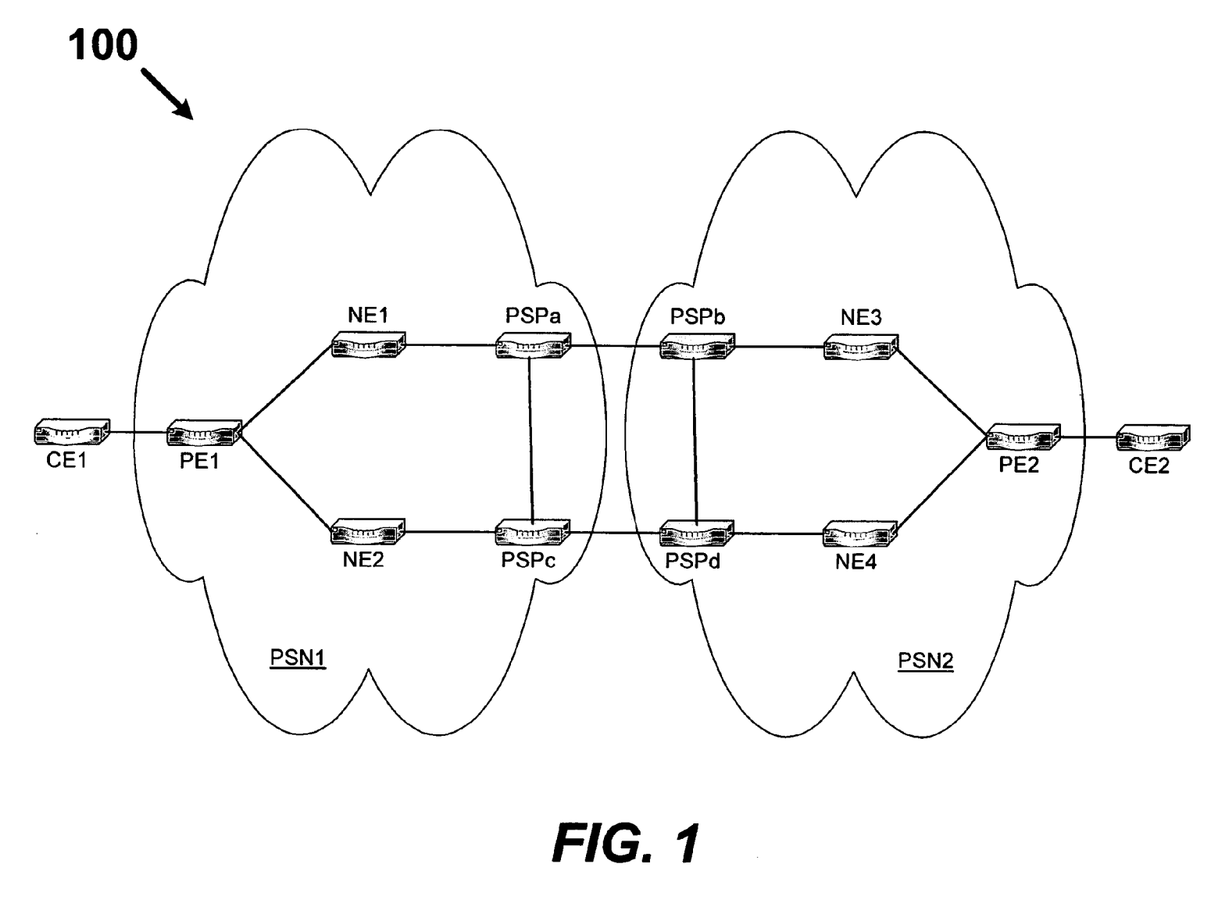
FIG. 1 illustrates an example network comprising a plurality of pseudowire elements forming a multi-segment pseudowire.

FIG. 1 shows a network 100 comprising a plurality of pseudowire elements forming a multi-segment pseudowire ("MS-PW"). Pseudowire elements are network elements (e.g., routers, switches, etc.) that are capable of determining which network traffic is being transmitted on a pseudowire and will have some capability in handling the pseudowire traffic. Pseudowire elements may be referred to herein as being pseudowire-aware. On the other hand, for network elements that are not pseudowire-aware, the pseudowire traffic is transparent. That is, a network element that is not pseudowire-aware cannot differentiate between the pseudowire traffic and other network traffic that passes through the network element. In FIG. 1, the pseudowire elements are PE1, PE2, PSPa, PSPb, PSPc, and PSPd. The network elements that are not pseudowire-aware (i.e., are not pseudowire elements) are NE1, NE2, NE3, and NE4.

The two PEs (i.e., PE1 and PE2) provide a MS-PW service to the CEs (i.e., CE1 and CE2). PE1 and PE2 reside in different autonomous systems, PSN1 and PSN2, respectively. The network 100 also comprises a plurality of Pseudowire Stitching Points ("PSPs"): PSPa, PSPb, PSPc, and PSPd. A pseudowire-stitching mechanism is a mechanism that permits a service provider to extend an existing PW with another PW. In other words, the stitching mechanism replaces the AC by another PW of the same type or a different type. In FIG. 1, for example, PSPa is stitched to PSPb, allowing a pseudowire segment ending at PSPa to be connected to a pseudowire segment ending at PSPb to form a MS-PW. The path from PE1 through PSPa and PSPb to PE2 is thus a MS-PW having three pseudowire segments: 1) the segment from PE1 to PSPa in PSN1, 2) the segment from PSPa to PSPb, and 3) the segment from PSPb to PE2 in PSN2.

The present invention provides for fast restoration of multi-segment pseudowire connections so as to reduce loss of connectivity during failure of a pseudowire element within the end-to-end path of a given pseudowire. By way of example, the primary pseudowire between PE1 and PE2 takes a path of PE1→NE1→PSPa→PSPb→NE3→PE2 with PE1 being the head-end and PE2 being the tail-end. It is clear from FIG. 1 that other paths may exist, such as the following:

PE1→NE1→PSP*a*→PSP*c*→PSP*d*→NE4→PE2

PE1→NE1→PSP*a*→PSP*c*→PSP*d*→PSP*b*→NE3→PE2

PE1→NE2→PSPc→PSPd→NE4→PE2

PE1→NE2→PSPc→PSPd→PSPb→NE3→PE2.

If PSPa or PSPb fail, eventually the PE1 to PE2 pseudowire will recover based on IGP convergence within all segments of the end-to-end path. However, this convergence time can be extensive given the multiple segment nature of the pseudowire. Since pseudowire segments in multi-segment pseudowires are signaled a priori and only between pseudowire switching routers, multi-level pseudowires suffer from a lack of reachability information. Because of this lack of reachability information, rerouting and repair of defects in the pseudowire can occur only at the transport layer (i.e., MPLS or IP), which carries the pseudowire segments between the switching points. Thus, the fast restoration of an end-to-end pseudowire path is not possible using conventional signaling protocols. With conventional technology, restoration of an end-to-end pseudowire path requires the entire end-to-end pseudowire path to be resignalled or requires the use of manual methods, which are slow, prone to error, and insufficiently resilient to additional future failures.

Embodiments disclosed herein provide for fast restoration of a multi-segment pseudowire so as to reduce loss of connectivity during failure of a pseudowire element within the end-to-end path of the multi-segment pseudowire. In accordance with embodiments of the present invention, at least one backup pseudowire path is pre-computed. That is, at least one backup path is computed prior to any detection of a failure in the primary pseudowire path. In particular embodiments, a plurality of backup paths are established such that for each PSP in the primary path of a multi-segment pseudowire, there is at least one backup path that does not include that PSP.

Figure 2:
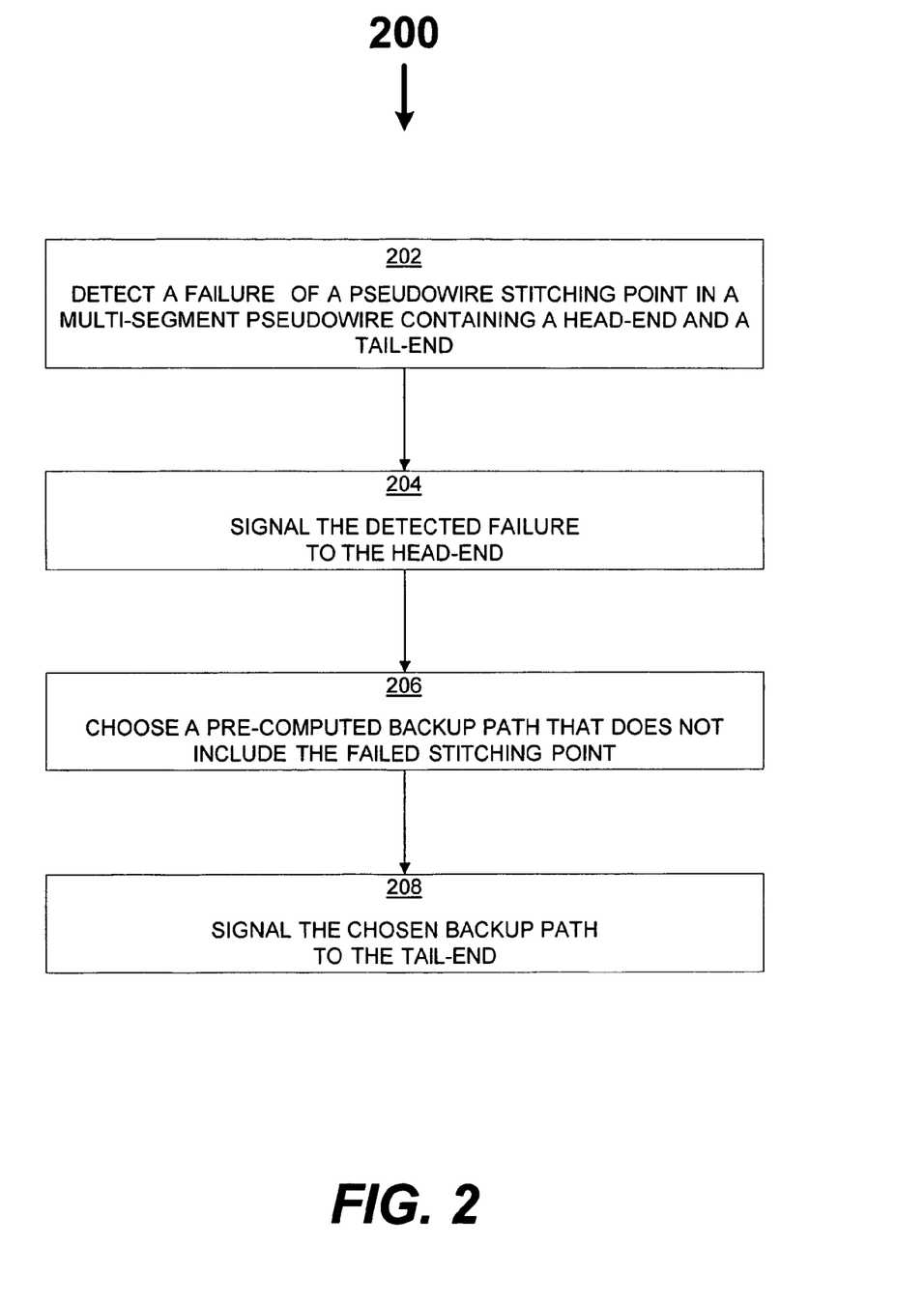
FIG. 2 illustrates an example method useful for protecting a multi-segment pseudowire.

FIG. 2 illustrates a first example method 200 useful for protecting multi-segment pseudowires. As illustrated in FIG. 2, when a pseudowire element detects a failure of a pseudowire stitching point in the primary pseudowire path, the failure is signaled to the head-end of the pseudowire. By failure of a pseudowire stitching point, it is meant herein that the failure can be due to the failure of the PSP itself or the failure can be due to failure in the link between the failed PSP and the upstream PSP that detects the failure. That is, if an upstream PSP is unable to communicate with the next downstream PSP, a failure in the downstream PSP is said to be detected. It should be noted that, because multi-segment pseudowires are bi-directional, each T-PE in a multi-segment pseudowire may serve as both a head-end and a tail-end, depending on which T-PE is the source of the network traffic. That is, the T-PE from which network traffic originates is referred to herein as the head-end of the multi-segment pseudowire with respect to that network traffic and the T-PE that receives network traffic is referred to herein as the tail-end of the multi-segment pseudowire with respect the received network traffic.

In step 202 of FIG. 2, a failure of a pseudowire stitching point in a multi-segment pseudowire is detected. That is, a path failure in a multi-segment pseudowire is detected. In step 204, the detected failure is signaled to the head-end of the multi-segment pseudowire. In step 206, a new path to be used for the pseudowire is chosen for the pseudowire from the at least one backup path that was pre-computed. The backup path does not include the failed stitching point. In step 208, the chosen new path to be used for the pseudowire is signaled to the tail-end of the pseudowire. The signaling of the new path to the tail-end can be conducted along the chosen backup path. Once the tail-end has been signaled of the switch to the backup path, the tail-end can then also switch to the backup path for traffic flowing in the reverse direction on the multi-segment pseudowire. While the present invention can be utilized with any multi-segment pseudowire, it is especially advantageous when the head-end and tail-end of the pseudowire reside in different domains, such as different autonomous systems.

By way of example, if PSPb fails in the network 100 of FIG. 1, the primary pseudowire path will no longer be available. However, the following paths would still be available:

PE1→NE1→PSPa→PSPc→PSPd→NE4→PE2

PE1→NE2→PSPc→PSPd→NE4→PE2.

Given these two available paths, a reroute decision could be taken by several elements in the path. Such a reroute decision needs to be taken in both directions of the traffic path. Since the PEs of the MS-PW are essentially the "owners" of the path selection, they should make the reroute decision on which path to take based on information returned to them by the PSPs.

Each PSP within the end-to-end path of a given MS-PW is responsible for signaling its ability to act as a stitching point for the pseudowire to head-end/tail-end. This is achieved through the advertisement of reachability for endpoints outside of the local autonomous system. Generally, reachability information refers to information required for a device to compute a path to reach the destination. For example, Layer-2 reachability means packets addressed at one end of the PW with a layer-2 address (commonly known as an Ethernet MAC address) can be forwarded correctly to the far end and received/processed by the switches on that side.

Figure 3:
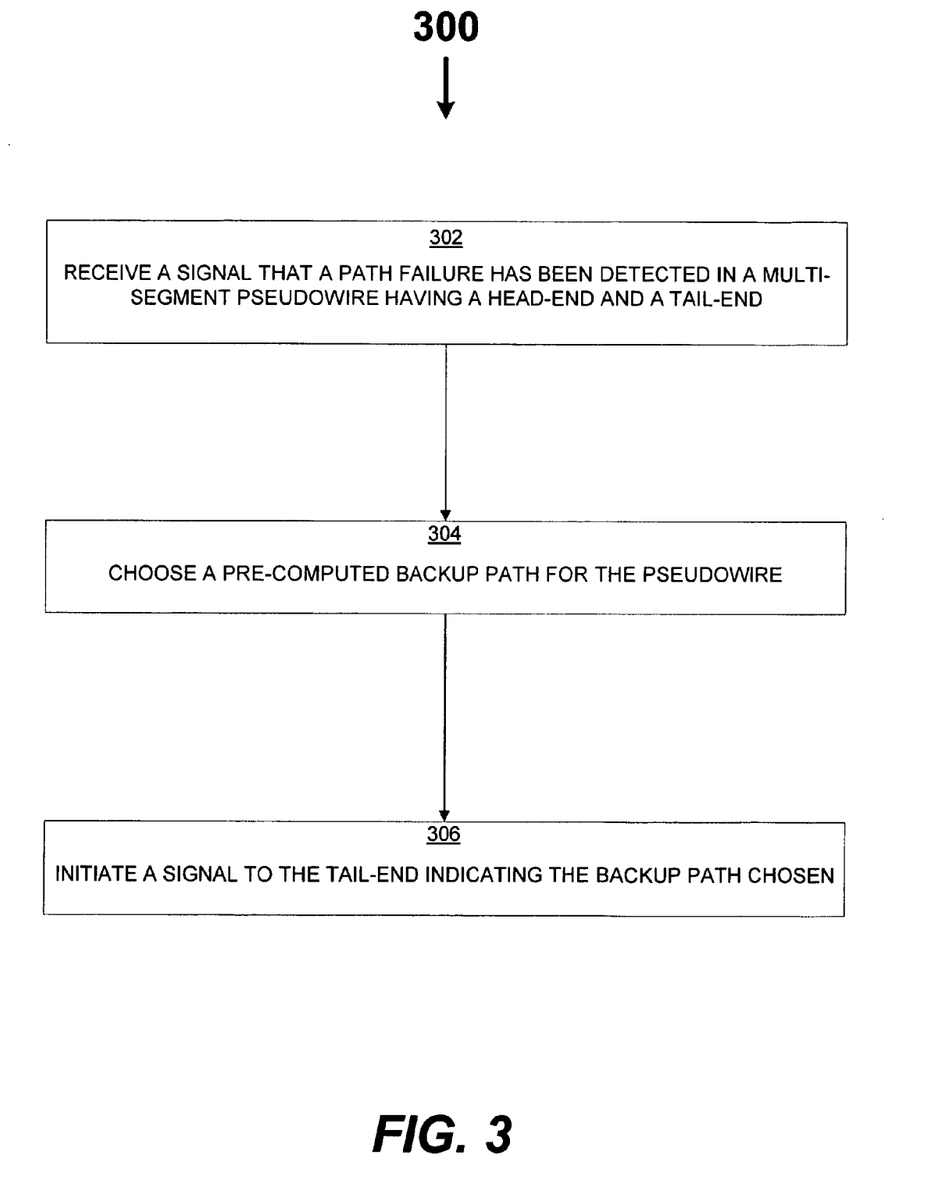
FIG. 3 illustrates a second example method useful for protecting multi-segment pseudowires.

FIG. 3 illustrates a second example method 300 useful for protecting multi-segment pseudowires. The example method 300 of FIG. 3 can be advantageously encoded in logic that is operable to perform the method. Such logic can be included in an apparatus that functions as a T-PE for a multi-segment pseudowire. In step 302, such an apparatus can receive a signal that a path failure has been detected in a multi-segment pseudowire having a head-end and a tail-end. In step 304, the apparatus can choose a pre-computed backup path for the pseudowire. In particular embodiments, the received signal includes an indication of a failed pseudowire stitching point and the chosen backup path does not include the failed pseudowire stitching point. In step 306, the apparatus can initiate a signal to the tail-end indicating the backup path chosen. In particular embodiments, the apparatus initiates the signal to the tail-end across the chosen backup path. The example method 300 of FIG. 3 can be advantageously utilized if the head-end and tail-end reside in different domains, such as different autonomous systems.

Figure 4:
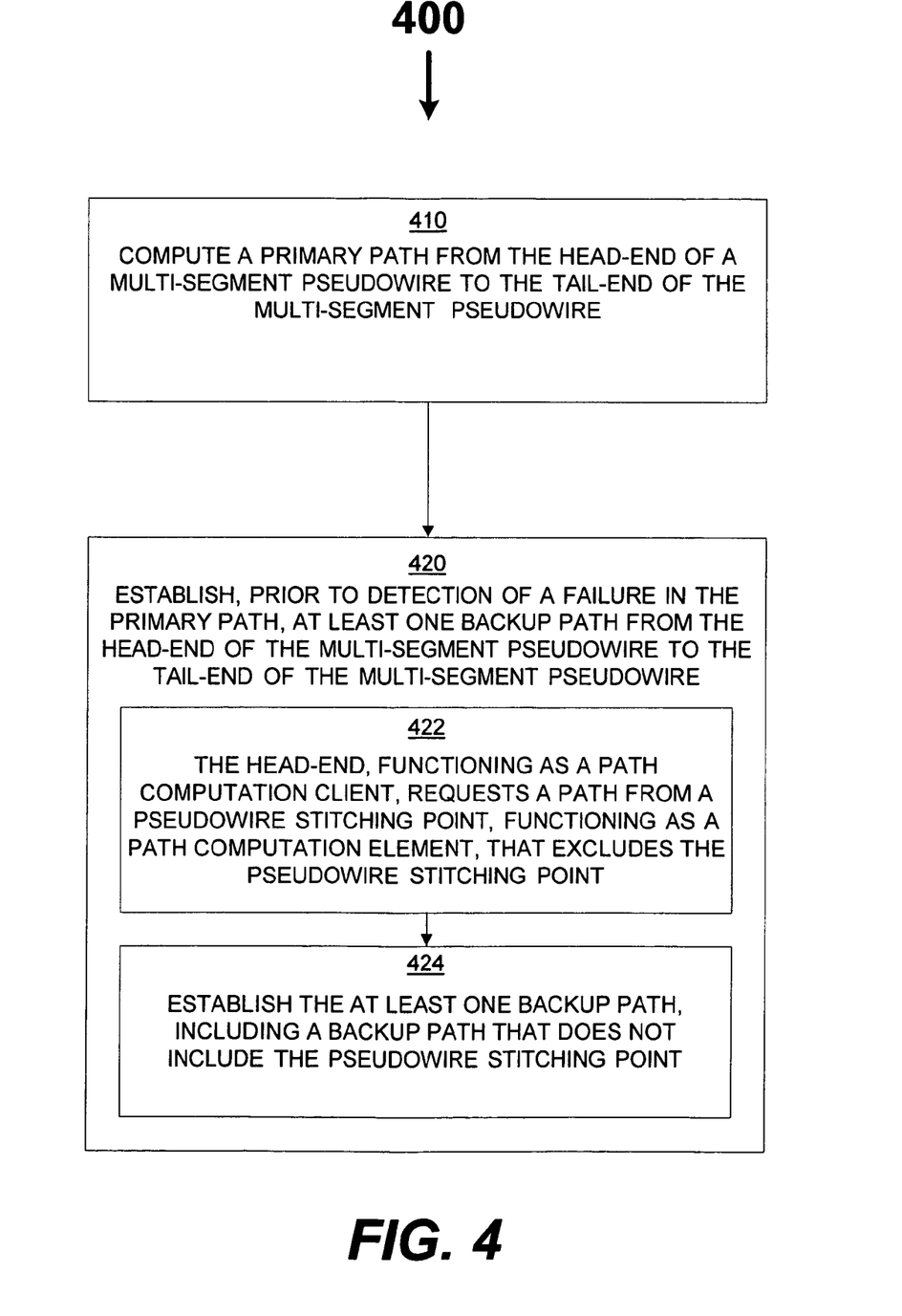
FIG. 4 illustrates a third example method useful for protecting multi-segment pseudowires.

FIG. 4 illustrates a third example method 400 useful for protecting multi-segment pseudowires. The example method 400 of FIG. 4 can be advantageously encoded in logic that is operable to perform the method. Such logic can be included in an apparatus that functions as a T-PE for a multi-segment pseudowire. In step 410, such an apparatus can compute a primary path from the head-end of a multi-segment pseudowire to the tail-end of the multi-segment pseudowire is computed. This primary path can identify all the pseudowire elements in the path.

In particular embodiments, the head-end and tail-end of a MS-PW initiate signaling for PW setup using directed Label Distribution Protocol ("LDP") with a given exit point PSP within their local autonomous system. The choice of which exit point to use can be based, for example, on Interior Gateway Protocol ("IGP") cost to the exit point or based on a dynamic selection criteria utilizing Path Computation Element Protocol ("PCEP"). It should be noted that the selection of best path also can be obtained using something other than IGP cost, such as Quality of Service ("QoS"), for example. The result of this signaling is the establishment of a primary path between the T-PEs (i.e., head-end and tail-end) of the MS-PW.

Numerous methods exist and may be used for setting up and maintaining pseudowires. These methods include LDP, BGP, and manual configuration (static). The PW will utilize an underlying network transport construct to convey packets between the endpoints of the PW. The underlying transport construct can be comprised of an MPLS LSP or MPLS Traffic Engineered Tunnel, an L2TPv3 tunnel, or a GRE tunnel, for example. Some transport mechanisms, such as TE tunnels, inherently are capable of spanning multiple domains, while some transport mechanisms have also been extended to achieve this goal. Some additional extensions are being designed such as Path Computation Element (PCE) to enhance these mechanisms which span domains, such as inter-provider boundaries. The result of signaling (i.e., setting up) a PW is the establishment of a primary path between the T-PEs (i.e., head-end and tail-end) of the MS-PW.

In addition to establishing a primary path for the MS-PW, a T-PE apparatus also may establish at least one backup path, which should be used upon failure of the primary path. This is shown in step 420 of FIG. 4. Such backup paths may be established prior to detection of a failure in the primary path. In fact backup paths may be established immediately after the primary path is established. A backup path should be a diverse path which takes into account failure of any PSP along the primary path of the MS-PW.

In particular embodiments shown as step 422 in FIG. 4, a T-PE apparatus may function as a Path Computation Client ("PCC") and request a path from a PSP that is functioning as a Path Computation Element ("PCE"). The PSP may compute a path excluding itself as a stitching point. The multi-segment pseudowire can use this computed path in the future when a failure in this PSP is detected. That is, the T-PE may establish a backup path excluding this PSP so that the established backup path can be used later if a failure in this PSP is detected.

A Path Computation Element ("PCE") is an entity (e.g., component, application, or network node) that is capable of computing a network path or route based on a network graph, and of applying computational constraints during the computation. A Path Computation Client ("PCC") is an application requesting a path computation to be performed by a PCE. PCEP is a protocol for communications between a PCC and a PCE, or between two PCEs. A PCC can request a path from a PCE by sending a PCReq message to the PCE. A PCE can reply to a requesting PCC by sending a PCRep message to the PCC. A PCRep message can either contain a set of computed path(s) if the request could be satisfied or a negative reply otherwise.

In particular embodiments, a new Path Computation Element ("PCE") communication Protocol ("PCEP") object may be defined in order for a Path Communication Client ("PCC") to request a diverse path from an existing multi-domain path along with various path constraints. One of ordinary skill in the art should be capable of creating such a PCEP object without undue experimentation. In the context of multi-segment pseudowires, a PCC may decide to request the exclusion of one or more PSPs based upon the increased path cost due to the diversity constraint. For example, PE1 may request from PSPa (acting as a PCE) to compute a path excluding itself as a stitching point. Conversely, it may request a fully end-to-end diverse path excluding a list of stitching points. Several combinations may be requested in a single request along with the path costs thus allowing the head-end (i.e., the PCC) to make an appropriate decision after evaluation of the tradeoff between path diversity and cost. It should be noted that the PCRep message returned to the PCC will only comprise the list of traversed PSPs along with the related cost. Such PSPs' address will then be used by signaling to establish the multi-segment pseudowire. It should also be noted that more than one PCE may be involved in such computation should the end-to-end path traverse more than 2 domains. It should also be noted that path segmented diversity should be evaluated by the PCE by performing a Shortest Path First ("SPF") computation on the path (based on IGP cost for example) from each entry PSP to the tail-end.

Upon failure on any PSP within the primary path of a MS-PW, a PSP that detects the failure signals the failure to the head-end of the MS-PW. Taking the example of FIG. 1, if PSPb fails, PSPa may signal the failure to PE1, telling PE1 to switch to its backup. PE1 should ensure that the backup path does not contain the failed element PSPb. Therefore an indication of the failed segment (i.e., the segment between PSPa-PSPb) should be returned by PSPa to PE1. However, PSPb is unable to signal failure of the MS-PW so PE1 sends a "forward explicit" notification to PE2 across the backup path, telling PE2 that the backup path is now in place. PE2 then switches to the backup path.

In particular embodiments, network devices may comprise logic configured to perform methods disclosed herein. The logic may comprise hardware, such as Attachment Circuitry, for example. The logic may also comprise software configured to implement methods disclosed herein. Such logic embodied in network devices can be produced without undue experimentation by one of ordinary skill in the art of telecommunications upon review of disclosures made herein. For example, in particular embodiments a PE may comprise logic configured to 1) function as a head-end of a multi-segment pseudowire; 2) compute a primary path from the head-end to a tail-end of the multi-segment pseudowire; and 3) establish, prior to detection of failure in the primary path, at least one backup path for the multi-segment pseudowire. In other particular embodiments, a network comprising a plurality of pseudowire elements forming a multi-segment pseudowire containing a head-end, a tail-end, and a plurality of pseudowire stitching points; may also comprise logic configured to 1) detect a failure of a pseudowire stitching point in the multi-segment pseudowire; 2) signal the detected failure to the head-end; 3) choose a pre-computed backup path; and 4) signal the backup path to the tail-end.

Figure 5:
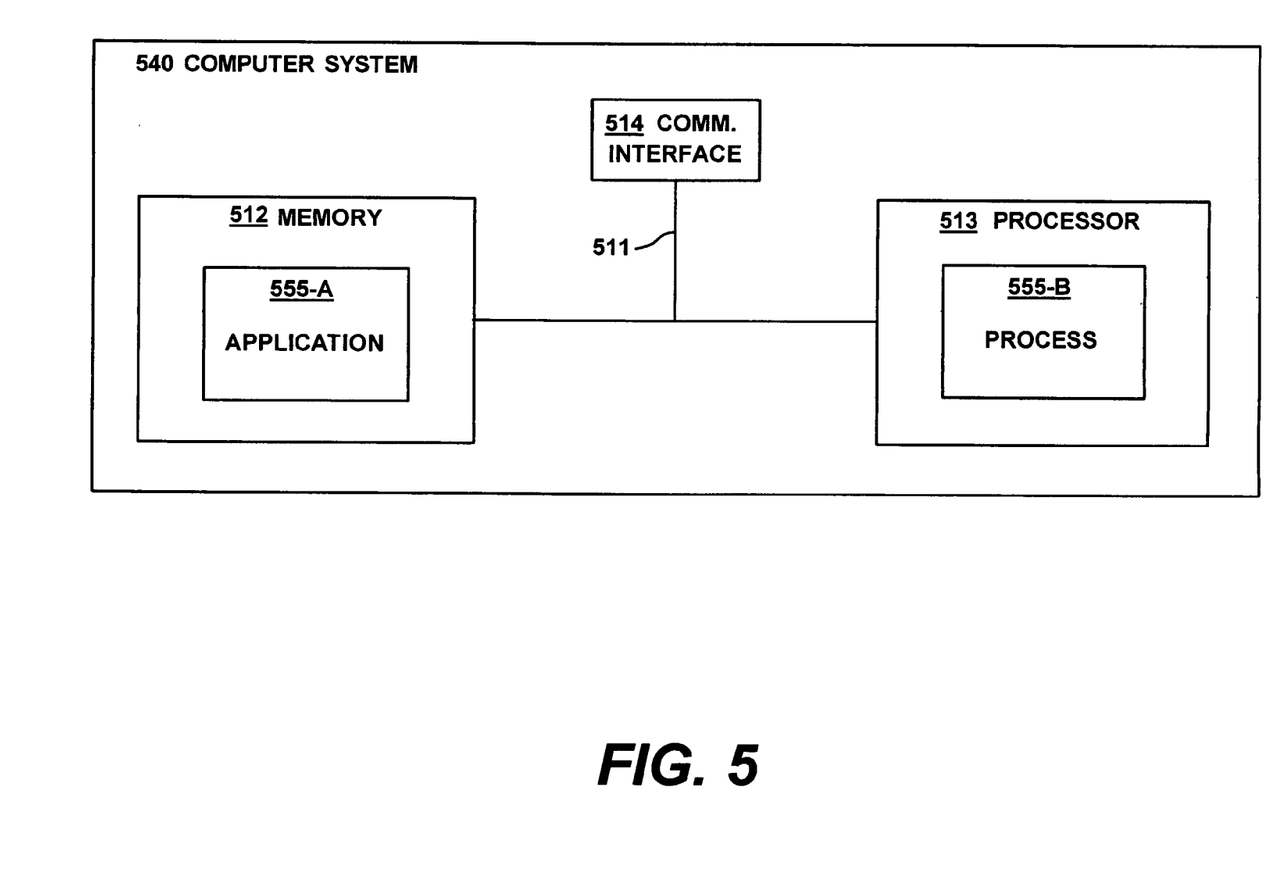
FIG. 5 illustrates an example computer system architecture for a computer system that performs methods useful in protecting multi-segment pseudowires in accordance with embodiments disclosed herein.

FIG. 5 illustrates an example computer system architecture for a computer system 540 that performs methods useful in protecting multi-segment pseudowires in accordance with embodiments disclosed herein. The computer system 540 may be any type of computerized system such as a personal computer, workstation, portable computing device, mainframe, server or the like. In this example, the system includes an interconnection mechanism 511 that couples a memory system 512, a processor 513, and a communications interface 514. The communications interface 514 allows the computer system 540 to communicate with external devices or systems.

The memory system 512 may be any type of computer readable medium that is encoded with an application 555-A that represents software code such as data and/or logic instructions (e.g., stored in the memory or on another computer readable medium such as a disk) that embody the processing functionality of embodiments of the invention as explained above. The processor 513 can access the memory system 512 via the interconnection mechanism 511 in order to launch, run, execute, interpret or otherwise perform the logic instructions of the application 555-A for the host in order to produce a corresponding process 555-B. In other words, the process 555-B represents one or more portions of the application 555-A performing within or upon the processor 513 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 512 (e.g., within random access memory or RAM). It is also to be understood that other embodiments of the invention can provide the applications operating within the processor 513 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon.

The protection of multi-segment pseudowires by utilizing pre-computed backup paths is herein disclosed. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

We claim:

1. A method comprising:
   signaling, with a first pseudowire stitching point, to at least one of a head-end network device or a tail-end network device an ability of the first pseudowire stitching point to act as a stitching point for a multi-segment pseudowire, wherein the multi-segment pseudowire extends from the head-end network device to the tail-end network device, wherein a primary path of the multi-segment pseudowire includes the first pseudowire stitching point and a second pseudowire stitching point, wherein the multi-segment pseudowire transits a plurality of packet switch network tunnels, and wherein the signaling comprises advertising reachability information of the first pseudowire stitching point to at least one of the head-end network device or the tail-end network device,
   wherein, for each respective pseudowire stitching point on a primary path of the multi-segment pseudowire that signals an ability to act as a stitching point for the multi-segment pseudowire, a backup path that excludes the respective pseudowire stitching point is computed prior to a failure of the respective pseudowire stitching point;
   detecting a failure of the second pseudowire stitching point with the first pseudowire stitching point; and
   transmitting data indicative of the failure of the second pseudowire stitching point to the head-end network device from the first pseudowire stitching point, wherein the pre-computed backup path that excludes the second pseudowire stitching point is selected by the head-end network device in response to receipt of the data, and the pre-computed backup path is selected by the tail-end network device in response to receipt of a signal initiated by the head-end network device to the tail-end network device over the pre-computed backup path, the signal indicative of selection of the pre-computed backup path by the head-end network device.

2. The method of claim 1, wherein the head-end network device resides in a different domain than the tail-end network device, and the tail-end network device is at a tail end of the multi-segment pseudowire.

3. The method of claim 1, wherein the head-end network device resides in a different autonomous system than the tail-end network device, and the tail-end network device is at a tail end of the multi-segment pseudowire.

4. The method of claim 1, further comprising:
   managing a timing and an ordering of service specific bit streams.

5. The method of claim 1, wherein the head-end network device is a terminal provider edge.

6. The method of claim 1, wherein the reachability information is defined on open systems interconnection (OSI) model layer 2.

7. The method of claim 1, wherein the multi-segment pseudowire is configured to emulate attributes of a plurality of telecommunications services on a packet switched network, and wherein the plurality of telecommunications services include two or more services selected from a group including a frame relay service, an asynchronous transfer mode service, an Ethernet service, a time division multiplexing (TDM) service, a synchronous optical networking (SONET) service, a synchronous digital hierarchy (SDH) service, and a T1 service.

8. A head end network device of a multi-segment pseudowire, wherein the multi-segment pseudowire extends from the head-end network device to a tail-end network device, and wherein the multi-segment pseudowire spans a plurality of packet switch network tunnels, the head end network device comprising:
   a processor;
   a communication interface; and
   a memory comprising instructions executable by the processor, wherein the processor is in communication with memory and the communication interface;
   the communication interface is configured to receive, from each respective pseudowire stitching point on a primary path of the multi-segment pseudowire, an indication of an ability to act as a stitching point for the multi-segment pseudowire and reachability information of each respective pseudowire stitching point on the primary path;
   the instructions are configured to determine, for each respective pseudowire stitching point on the primary path of the multi-segment pseudowire that signals an ability to act as a stitching point for the multi-segment pseudowire, a backup path that excludes the respective pseudowire stitching point, wherein the backup path for each respective pseudowire stitching point is a pre-computed backup path because the backup path is computed prior to a failure in any pseudowire stitching point on the primary path; and
   the instructions are further configured to select the pre-computed backup path that excludes a failed pseudowire stitching point in response to receipt of an indication of a failure of the failed pseudowire stitching point.

9. The head end network device of claim 8, wherein the communication interface is further configured to transmit a signal to the tail-end network device over the pre-computed backup path, wherein the pre-computed backup path is selected by the tail-end network device in response to receipt of the signal from the head-end network device.

10. The head end network device of claim 8, wherein the head end network device of the multi-segment pseudowire resides in a different domain than the tail-end network device of the multi-segment pseudowire.

11. The head end network device of claim 8, wherein the head end network device of the multi-segment pseudowire resides in a different autonomous system than the tail end network device of the multi-segment pseudowire.

12. The head end network device of claim 8, wherein the reachability information is defined on open systems interconnection (OSI) model layer 2.

13. The head end network device of claim 8, wherein the multi-segment pseudowire is configured to emulate attributes of a plurality of telecommunications services on a packet switched network, and wherein the plurality of telecommunications services include two or more services selected from a group including a frame relay service, an asynchronous transfer mode service, an Ethernet service, a time division multiplexing (TDM) service, a synchronous optical networking (SONET) service, a synchronous digital hierarchy (SDH) service, and a T1 service.

14. A non-transitory computer readable medium having stored thereon a computer program comprising instructions executable with a processor to:
   signal, at a first pseudowire stitching point, to at least one of a head-end network device or a tail-end network device an ability of the first pseudowire stitching point to act as a stitching point for a multi-segment pseudowire, wherein the multi-segment pseudowire extends from the head-end network device to the tail-end network device, wherein a primary path of the multi-segment pseudowire includes the first pseudowire stitching point and a second pseudowire stitching point, wherein the multi-segment pseudowire is configured to emulate attributes of a plurality of telecommunications services on a packet switched network, and wherein the signal of the ability comprises an advertisement of reachability information of the first pseudowire stitching point to the at least one of the head-end network device or the tail-end network device,
   wherein, for each respective pseudowire stitching point on a primary path of the multi-segment pseudowire that signals an ability to act as a stitching point for the multi-segment pseudowire, a backup path that excludes the respective pseudowire stitching point is computed prior to a failure of the respective pseudowire stitching point;
   detect a failure of the second pseudowire stitching point at the first pseudowire stitching point; and
   transmit data indicative of the failure of the second pseudowire stitching point to the head-end from the first pseudowire stitching point, wherein the pre-computed backup path that excludes the second pseudowire stitching point is selected by the head-end network device in response to receipt of the data, and the pre-computed backup path is selected by the tail-end network device in response to receipt by the tail-end network device, over the pre-computed backup path, of an indication of the failure of the second pseudowire stitching point.

15. The non-transitory computer readable medium of claim 14, wherein the head-end network device is a terminal provider edge.

16. The non-transitory computer readable medium of claim 14, wherein the reachability information is defined on open systems interconnection (OSI) model layer 2.

17. The non-transitory computer readable medium of claim 14, wherein the multi-segment pseudowire is configured to manage a timing and an ordering of service-specific bit streams.

* * * * *